Aug. 31, 1954
S. RENAUD
2,687,650
VARIABLE SPEED CONTROL DEVICE
Filed April 23, 1951
3 Sheets-Sheet 1
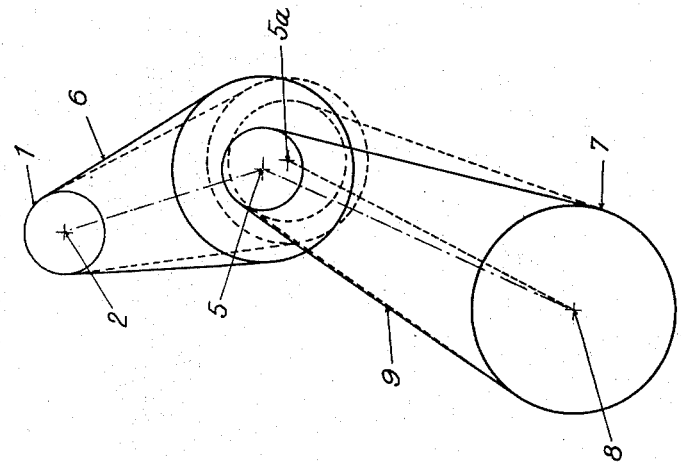
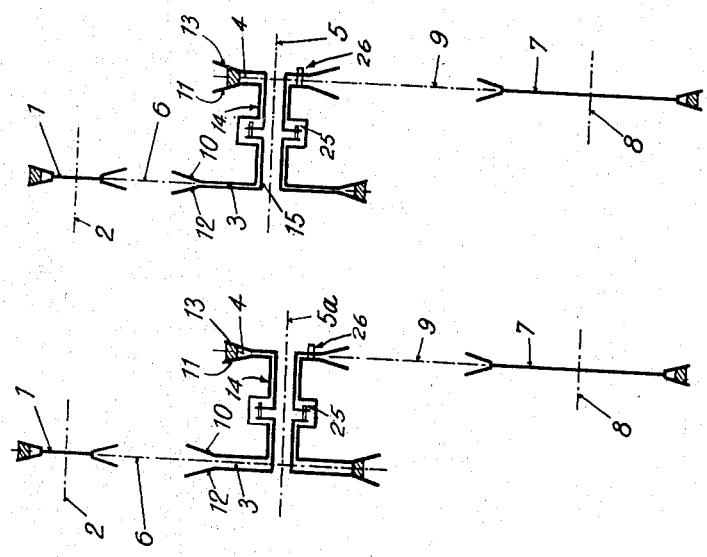
INVENTOR.
SAMUEL RENAUD
BY Reynolds, Beach & Christensen
ATTORNEYS

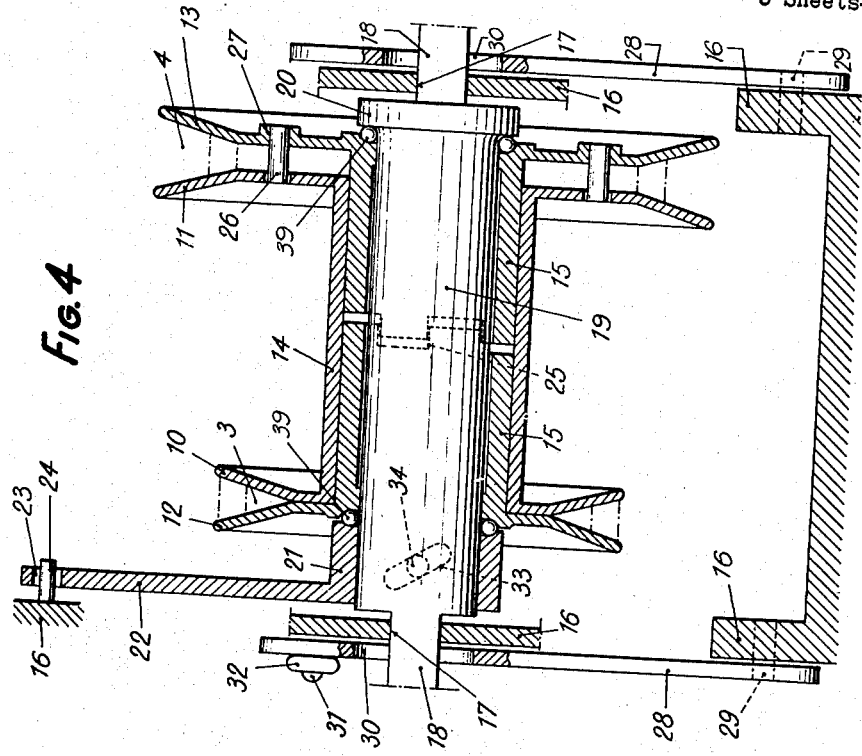
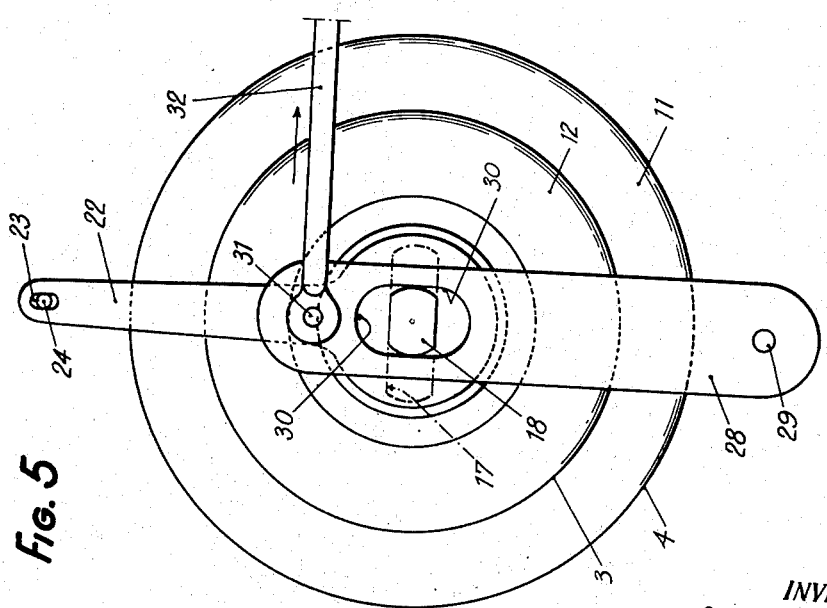

Aug. 31, 1954
S. RENAUD
2,687,650
VARIABLE SPEED CONTROL DEVICE
Filed April 23, 1951
3 Sheets-Sheet 3
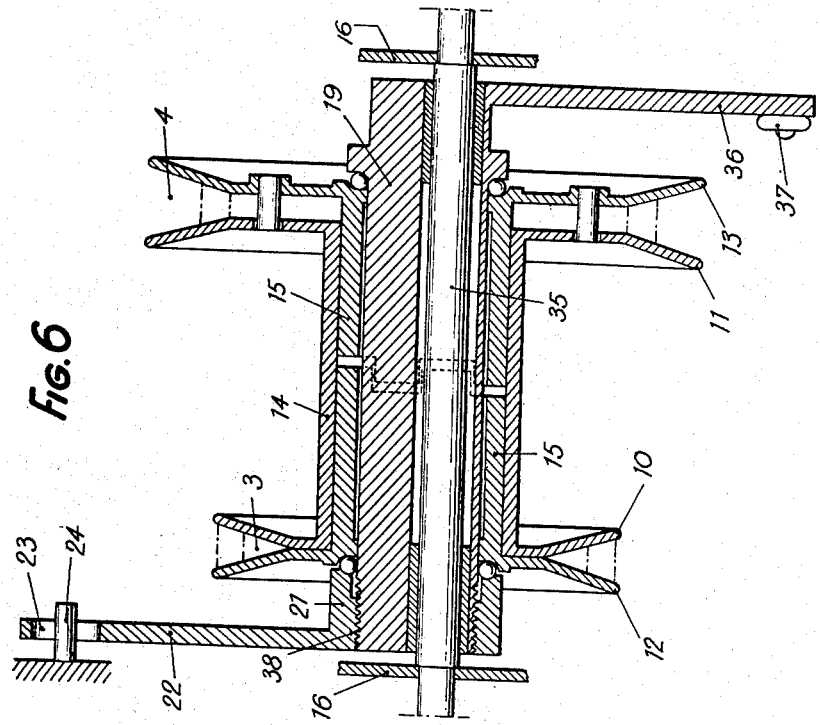
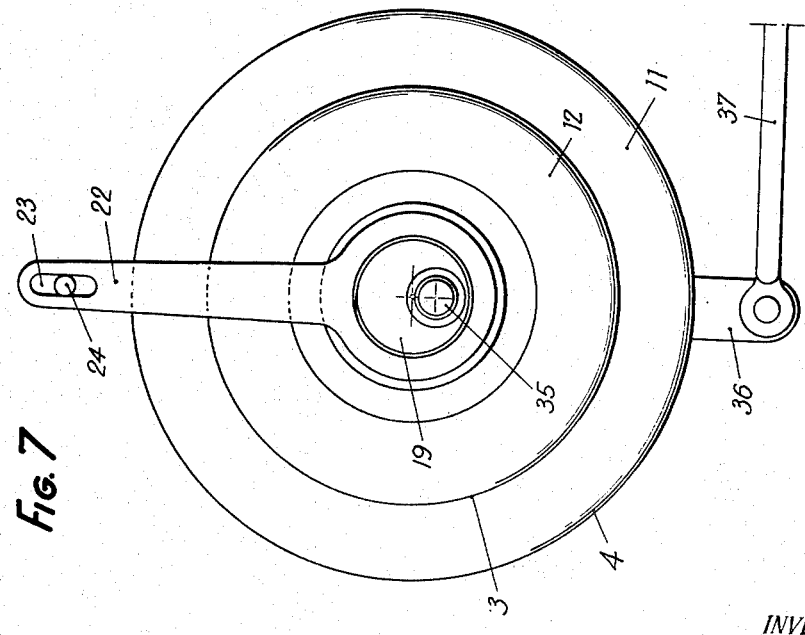
INVENTOR.
SAMUEL RENAUD
BY
Reynolds, Beach & Christensen
ATTORNEYS Patented Aug. 31, 1954

2,687,650

UNITED STATES PATENT OFFICE 2,687,650

VARIABLE SPEED CONTROL DEVICE

Samuel Renaud, Dijon, France, assignor to "Etablissements Terrot," Dijon, France, a company Application April 23, 1951, Serial No. 222,412

5 Claims. (Cl. 74—230.17)

The present invention relates to a mechanism for producing a progressive change in speed through the use of axially expandable and contractible V-pulleys, which is applicable to any transmission system provided with V-belts and an intermediate or jack shaft.

The object of the invention is to effect speed changes progressively, by infinite increments, by reason of the combined and opposite variation in the winding diameter of two coaxial intermediate expandable pulleys, as related to a driving and to a driven pulley, respectively, whilst maintaining the corresponding belts in their plane and retaining unchanged the tension thereof in all shifted or adjusted positions of the expandable pulleys.

For this purpose, the progressive change in speed according to the invention is accomplished by the combination of an assembly of two coaxial combined pulleys, of mutually or oppositely variable winding diameter, wherein the space included between the two cheeks is oppositely modified, together with actuating means for displacing the axis common to the pulleys through positions parallel to itself, the two pulleys being arranged and adapted in such a manner that at least two cheeks of the assembly, one in each such pulley, are capable of sliding axially under the simultaneous action of the tension of the belts and actuating means in order to increase the winding diameter of one of the belts about such a pulley whilst reducing that of the other, and in addition, the outer cheeks of the assembly are each secured to an axially contractible and expansible connecting member, the two free ends of these connecting members being keyed angularly one relatively to the other by a coupling allowing of an axial movement of each cheek, under manual or automatic control, independently of the shift that accomplishes automatic adjustment to equalize the belts' tension.

According to another feature of the invention, the internal cheeks of the assembly are connected rigidly in such a manner as to be capable of sliding conjointly on their axis of rotation.

According to another feature of the invention, the internal and external cheeks are keyed angularly amongst themselves by coupling means.

According to another feature of the invention, the axis of rotation of the pulleys is restrained and guided in such a manner as to be capable of being moved along a planar path.

According to another feature of the invention, the axis of rotation of the pulleys is restrained and guided in such a manner as to be capable of being moved along a part-cylindrical path.

According to another feature of the invention, compensation means are actuated in such a manner as to effect a complementary modification of the diameter of winding of one of the pulleys when the tension of the corresponding belt varies.

According to another feature of the invention, the external cheeks are mounted directly on a hub capable of slight axial movement under the action of compensating means, in order that one of the cheeks is driven axially by the hub for modifying the winding diameter of the corresponding pulley.

According to another feature of the invention, compensating means are formed by a member secured to the hub cooperating with a member actuated in such a manner as to move at the same time as the hub is moved under the action of the operating member in order to urge the hub in the transverse direction.

In order that the invention may be more readily understood, at the same time by way of example in no sense limiting, one form of construction is described hereinafter and shown diagrammatically in the following accompanying drawings, wherein:

Fig. 1 is a diagrammatic view in plan of a change speed device according to the invention shown in one of the extreme positions.

Fig. 2 is a view similar to that of Fig. 1, corresponding with the other extreme position.

Fig. 3 is a view in side elevation of the same device in the position of Fig. 1, the extreme positions according to Fig. 2 being shown in broken lines.

Fig. 4 is an axial section to a larger scale, of the same device, with an actuating member capable of moving the axis of the device in the same plane.

Fig. 5 is a view in side elevation of the form of Figure 4.

Fig. 6 is an axial section, to the same scale, of the same device, with a control member capable of moving the axis of the device along a cylindrical surface, and Fig. 7 is a view in side elevation of the form shown in Figure 6.

The assembly shown in Figs. 1 to 3 is formed essentially by a driving pulley 1 of unchangeable diameter turning about an axis 2 which may be considered as fixed, a change speed device comprising two coaxial pulleys 3 and 4 each of changeable diameter turning about an intermediate or jack-shaft axis 5 which is shiftable relative to the axis 2, through an infinite number of parallel positions within its range of shifting, and driven by a belt 6, and a pulley 7 of unchangeable diameter turning about an axis 8 which also may be considered as fixed, and driven by a belt 9 passing around the pulley 4.

Each intermediate or expandible pulley is formed by two cheeks 10, 12, and 11, 13. The internal cheeks 10 and 11 are formed integral with each other, through the medium of a sleeve 14. The external cheeks 12, 13 are formed with individual sleeves 15 so that they may shift slightly axially, the one relative to the other, but are clutched together at 25 for conjoint rotation. Also, the internal and the external cheeks are held together at 26 for rotation of all conjointly, notwithstanding axial shifting of internal cheeks 10, 11 and their sleeve 14 relative to external cheeks 12, 13, and of the cheeks 12, 13 relative to one another.

In the extreme position of Fig. 1, which corresponds with the low speed, the cheeks 10, 12 of the pulley 3 are approached as close as possible, so that this pulley has the diameter of maximum winding. At the same time the cheeks 11, 13 of the pulley 4 are spaced apart as far as possible, and as a result the pulley 4 has a diameter of minimum winding. The pulleys 3 and 4 are thus seen to be mutually and oppositely changeable in diameter.

When the axis 5 is moved parallel to itself, in such a manner as to move it as far as possible away from the axis 2, whilst the pulleys 1 and 3, 4 and 7 remain, for example, in the same planes, so as to arrive at 5a (Figs. 2 and 3), it will be appreciated that the tension of the driving belt 6 increases because the distance between the axes 2 and 5 increases, whilst that of the driven belt 9 decreases, because the spacing of the axes 5 and 8 decreases. It then results that, as the sleeve 14 slides freely in an axial direction, the belt 6 applies to the cheeks 10, 12 a thrust which withdraws the cheek 10 from the cheek 12 by causing the sleeve 14 to slide towards the right, in the figure. Thus the reduction in the winding diameter of the belt 6 on the pulleys 3 annuls the increase in tension of this belt. As another consequence of the said sliding, the cheek 11 approaches the cheek 13, whilst increasing the winding diameter of the pulley 4, and the increase of the winding diameter of this pulley annuls the reduction in tension of the belt 9. This does not, for all designs, insure that the belt tensions will remain equal in all displaced positions of the axis 5; they will ordinarily remain equal only if the design incorporates compensating means to expand or contract one of the pulleys 3, 4 automatically or manually in accordance with the tendency of a particular design to increase or to decrease the belts' tension by a given displacement of axis 5. Compensatory means to this end constitutes one of the important features of this invention.

It will be seen that the intermediate axis 5 may be moved, by means of a suitable member, in such a manner as to remain in the same plane, or alternatively, to describe a part-cylindrical surface, or even any other surface. Further, it will be understood that the increase of the distance between the two axes 5 and 2 does not correspond, in some cases, with the reduction in distance between the axes 5 and 8, and that, for this reason, the displacement of the intermediate axis 5 cannot alone exactly compensate for the change in belt tension. In order to remedy this, the relative position of the axes 2, 5 and 8 and the winding diameter of one pulley, independently of that caused by displacement of axis 5, is determined in such a manner as to ensure a constant tension of the belts during the movement from 5 to 5a. However, in the case in which one of the axes, 8 for example, is not fixed actually, but is movable (case of rear suspension), a driven or automatic compensating device modifies the winding diameter of one of the belts in such a manner as to reestablish the correct tension of the belts.

In the form of construction shown in Figs. 4 and 5, relating to the case of a change speed device provided with a control member moving the axis of the pulleys along a plane, it has been assumed that the whole of the device is supported by a chassis 16.

The chassis is provided with two longitudinal or straight-line guides 17 in which slide, toward opposite sides from the middle of the guide, the axial supports 18 of a hub 19 of which one end is provided with a collet 20. The supports 18 have two plane faces contacting respectively the upper and lower faces of each guide, so that they are capable of being moved in this guide without being able to turn.

On the end of the hub opposite the collet 20, is mounted a sleeve 21, provided with an arm 22, which has, for example, an elongated opening 23 into which penetrates a pin 24 fixed to the chassis 16. The sleeve 21 and the collet 20 serve in particular as stops for two ball bearings 39 enabling the pulleys to turn on the hub and absorb the reactions due to the belts.

Between the two stops thus formed and on the ball bearings 39 rest the external cheeks 12, 13 of the pulleys 3, 4, each cheek being extended by a tubular part 15 provided with a coupling dog clutch 25, the two dogs angularly engaging the external cheeks, whilst enabling the spacing between these to be varied. By such means the cheeks 12 and 13 are not actually joined against relative axial movement, but are joined to prevent relative rotational movement.

On the tubular parts 15 slides, for example, a sleeve 14 supporting the internal cheeks 10, 11 of the pulleys 3 and 4 and joining these cheeks 10, 11 for conjoint axial and rotational movement, only, whilst prohibiting movement of one relative to the other. Finally, a pin 26 secured to the cheek 11 is engaged within a bore 27 passing through the cheek 13 in such a manner that while the external cheeks 12, 13 and the internal cheeks 3 and 4 may be moved axially relatively to one another, they must all rotate together. Paired cheeks are wedged angularly, the cheeks 10, 12 and 11, 13 forming respectively the intermediate pulleys 3 and 4 one of which may be driven and the other of which will control and effect the rotation of other members.

The sleeve 14 carrying the internal cheeks is moved on tubular parts 15 as a result of the shifting of a control member preferably formed by levers 28, hinged at 29 to the chassis 16 and provided with openings 30, in which the axial supports 18 of the hub may move. To a lever 28 is secured at 31 a rod 32, in such a manner that when a force is applied thereto, in the direction of the arrow for example, the supports 18, being guided at 17, are moved perpendicularly to the plane of Fig. 4. When the driving pulley 1 is aligned with the left-hand pulley 3 and the pulley 4 at the right is aligned with the driven pulley 7, the sleeve 14 is moved automatically towards the right of Fig. 4, under the action of the tension of the belt, decreasing the winding diameter of the pulley 3 and increasing that of the pulley 4, in the manner already described.

The movement of the axis of the device may vary the tension of one of the belts, as above described, and a compensating device automatically restores correct tension. For example, the compensating member may be formed essentially by a helically directed slot 33 provided in the sleeve 21, and cooperating with a finger 34 secured to the hub 19. This slot 33 plays the part of a cam, so that during the transverse movement of the hub 19, the arm 22 anchored at the pin 24, produces rotation of the sleeve 21 about the axis of the figure. As the hub 19 cannot turn, the finger 34 pushed by the cam 33, imparts thereto a slight axial movement which, in the case of Fig. 4, crowds to the right the sleeve 15 of the cheek 12, and the entire sleeve 14, with respect to the sleeve 15 of cheek 13, and thus increases or reduces slightly the winding diameter of the pulley 4. The cam 33 is so determined or designed that in proportion as the axial supports 18 of the hub 19 move in the guide 17, the compensation of the tension of the belts is effected automatically.

It will be understood that this compensation may be non-automatic, and in the latter case will be controlled separately by a member actuated by hand.

The axis of the pulleys may also be moved parallel to itself otherwise than along a plane, that is, by describing for example a part-cylindrical surface, as shown in Figs. 6 and 7. This latter form is, indeed, the preferred one.

In these Figures 6 and 7, the members forming the pulleys 3 and 4 are the same as in the preceding case. However, the hub 19 is made eccentric relatively to a mounting spindle 35 mounted rotatably in the chassis 16, and is provided with an arm 36 to which is secured an operating arm 37. By applying a pull to this rod, the geometrical axis of the hub 19 is displaced along a cylinder centered at the axis of 35, the effect of which is to obtain, as in the preceding casing, the movement of the sleeve 14 and the corresponding modifications of the winding of the intermediate pulleys 3 and 4.

The compensating member is here formed essentially by a helically directed member taking the form of screw threads 38 provided in the sleeve 21 and cooperating with a screw-thread provided at the corresponding end of the hub 19. As in the preceding case, the arm 22 turns about the pin 24 when the axis of the hub 19 is displaced. But in this case the hub 19 can turn and, under the action of the screwing 38 entrained by the screwed sleeve 21, it receives a slight axial movement resulting in a modification of the diameter of winding of one of the pulleys 3 and 4.

In this arrangement, the compensation may be linear, that is to say proportional to the rotation of the eccentric, the screw pitch 38 being determined in such a manner as to ensure the compensation of the tension of the belts in proportion as the assembly of pulleys is displaced by the said eccentric.

It will be understood that the method of construction above described and shown in the drawing is only given by way of example in a non-limiting sense and it will be understood that it is possible to modify suitably the form, arrangement, the nature and the mounting of its elements, without, for this purpose, departing from the scope of the present invention.

What I claim is:

1. A variable speed control device for use with a driving and a driven pulley arranged in belted relation through the medium of V-belts connecting each such pulley with its respective one of two expandable pulleys, said device comprising a hub, means mounting and guiding said hub for bodily displacement along a definite path through various positions each parallel to its initial position, two separate pulley cheeks axially spaced upon, relatively axially shiftable along, and journaled for rotation about said hub, two connected but oppositely-facing pulley cheeks disposed intermediate the aforesaid separate cheeks, each of the connected cheeks in position complemental to its respective one of the separate cheeks, said connected cheeks being mounted upon the hub for rotation thereabout and for shifting axially therealong relative to said separate cheeks, for expansion and contraction of the two expandable pulleys thus constituted, means operatively interconnecting the several cheeks for conjoint rotation in all expanded or contracted positions, means to effect displacement of the hub and its pulleys along its guided path, to increase tension in the one V-belt and conversely to slacken tension in the other, and vice versa, and so to shift the connected cheeks axially, to effect expansion of the one pulley and consequent contraction of the other, means reacting between the hub and one of said separate cheeks to effect axial approach or recession of the said separate cheeks relative to one another, independently of shifting of the connected cheeks, and means to energize said approach-effecting means, to effect a compensating axial shift of the separate cheeks relative to one another, and to maintain substantially constant the tensions in the two V-belts in the several displaced positions of the hub, the approach-effecting means and its energizing means including a lever extending between the hub and a distant point, and restrained against displacement at such point, and cam means interengageable between the hub and said lever, inclined helically of the hub to shift the hub axially during and as a result of its displacement and the restraint of the lever's distant end, the lever bearing endwise against one of said separate cheeks, and the hub bearing oppositely endwise against the other separate cheek, to effect axial shift of the lever-engaged cheek as a result of the axial shifting of the hub.

2. A variable speed control device as in claim 1, wherein the lever is formed with a collar encircling the hub and bearing endwise against one of the separate cheeks, the lever being restrained against displacement at such distant point, the cam means comprising a helical slot in the collar and a pin carried by the hub and received in said helical slot, to shift the hub axially during and as a result of its displacement and the restraint of the lever's distant end, and the consequent axial thrust of the collar.

3. A variable speed control device for use intermediate a driving and a driven pulley through the medium of V-belts connecting each such pulley with its respective one of two expandable pulleys, said device comprising a non-rotative hub, mounting means for said hub defining a tilting axis parallel to but eccentric of the hub's axis, whereby as the hub is tilted it is bodily displaced along a definite part-cylindrical path, two separate pulley cheeks axially spaced upon, relatively axially shiftable along, and journaled for rotation about said hub, two connected but oppositely facing pulley cheeks disposed intermediate the spaced-apart separate cheeks, each of the connected cheeks in position complemental to its respective one of the separate cheeks, said connected cheeks being mounted upon the hub for rotation thereabout and for shifting axially therealong relative to said separate cheeks, for expansion and contraction of the two expandable pulleys thus constituted, means operatively interconnecting the several cheeks for conjoint rotation in all expanded or contracted positions, means to tilt the hub about said eccentric mounting means, and thus to effect displacement of the hub and its pulleys along the part-cylindrical path, to increase tension in the one V-belt and conversely to slacken tension in the other, and vice versa, and so to shift the connected cheeks axially, to effect expansion of the one pulley and consequent contraction of the other, means reacting between the hub and one of said separate cheeks to effect axial approach or recession of the said separate cheeks relative to one another, independently of shifting of the connected cheeks, and means automatically operable by tilting of the hub to energize said approach-effecting means, to effect a compensating axial shift of the separate cheeks relative to one another, and to maintain substantially constant the tensions in the two V-belts in the several tilted positions of the hub.

4. A variable speed control device as in claim 3, including a lever threadedly received on the hub and bearing endwise against one of said separate cheeks, to constitute the approach-effecting means, and means to restrain from displacement the end of said lever which is distant from the hub, during tilting of the hub, to constitute the means to energize the approach-effecting means.

5. A variable speed control device as in claim 1, wherein the hub displacing means includes rocking levers engaging the ends of the hub and pivotally mounted at their ends distant from the hub, and wherein the hub mounting and guiding means includes straight slots also engaging the ends of the hub and directed transversely of the length of said rocking levers, to guide the hub in a definite planar path.

References Cited in the file of this patent

UNITED STATES PATENTS

| Number | Name | Date |
| --- | --- | --- |
| 2,157,757 | Jacobsen | May 9, 1939 |
| 2,157,758 | Jacobsen | May 9, 1939 |
| 2,191,531 | Judelsohn | Feb. 27, 1940 |
| 2,209,484 | Tautz | July 30, 1940 |
| 2,267,238 | Irwin | Dec. 23, 1941 |
| 2,561,545 | Wallace | July 24, 1951 |

FOREIGN PATENTS

| Number | Country | Date |
| --- | --- | --- |
| 22,714 | Great Britain | A. D. 1911 |